US012782521B2

(12) United States Patent
Shirao et al.

(10) Patent No.: US 12,782,521 B2
(45) Date of Patent: Nov. 3, 2026

(54) OPTICAL SCANNING DEVICE AND RANGING APPARATUS

(71) Applicant: Mitsubishi Electric Corporation, Tokyo (JP)

(72) Inventors: Mizuki Shirao, Tokyo (JP); Fumio Shoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1046 days.

(21) Appl. No.: 17/972,369

(22) Filed: Oct. 24, 2022

(65) Prior Publication Data

US 2023/0043472 A1 Feb. 9, 2023

Related U.S. Application Data

(63) Continuation of application No. PCT/JP2020/025375, filed on Jun. 26, 2020.

(51) Int. Cl.
*G01S 7/48* (2006.01)
*G01S 7/481* (2006.01)
*G01S 7/4865* (2020.01)
*G01S 17/10* (2020.01)

(52) U.S. Cl.
CPC .......... *G01S 7/4817* (2013.01); *G01S 7/4865* (2013.01); *G01S 17/10* (2013.01)

(58) Field of Classification Search
USPC ................................................ 356/4.01, 5.01
See application file for complete search history.

(56) References Cited

U.S. PATENT DOCUMENTS

| | | | | |
|---|---|---|---|---|
| 7,482,730 | B2 * | 1/2009 | Davis | G02B 26/0833 310/333 |
| 7,485,485 | B2 * | 2/2009 | Linden | G02B 26/0841 438/45 |
| 9,746,611 | B2 * | 8/2017 | Singer | G01S 7/4817 |
| 10,209,603 | B2 * | 2/2019 | Inoue | G02F 1/2955 |
| 11,061,140 | B2 * | 7/2021 | Hosseini | G01S 7/4813 |
| 11,112,491 | B2 * | 9/2021 | Abediasl | G01S 7/484 |
| 2005/0173770 | A1 | 8/2005 | Linden et al. | |
| 2005/0179976 | A1 | 8/2005 | Davis et al. | |
| 2005/0280879 | A1 | 12/2005 | Gibson et al. | |
| 2013/0141895 | A1 | 6/2013 | Alpaslan et al. | |

(Continued)

FOREIGN PATENT DOCUMENTS

| | | |
|---|---|---|
| JP | 2007-522529 A | 8/2007 |
| JP | 2015-501951 A | 1/2015 |

(Continued)

OTHER PUBLICATIONS

International Search Report issued in PCT/JP2020/025375 (PCT/ISA/210), dated Sep. 8, 2020.

(Continued)

*Primary Examiner* — James R Hulka
(74) *Attorney, Agent, or Firm* — Birch, Stewart, Kolasch & Birch, LLP

(57) ABSTRACT

An optical scanning device includes an optical mode converter to change, in accordance with a change in wavelength of a light output from a light source or phase of the light output from the light source, a radiation direction of the light, and an actuator to rotate the optical mode converter about each of two shafts orthogonal to each other.

12 Claims, 11 Drawing Sheets

(56) References Cited

U.S. PATENT DOCUMENTS

| | | | | |
|---|---|---|---|---|
| 2013/0258451 | A1 | 10/2013 | El-Ghoroury et al. | |
| 2015/0033539 | A1 | 2/2015 | El-Ghoroury et al. | |
| 2017/0139141 | A1 | 5/2017 | Singer | |
| 2018/0088439 | A1 | 3/2018 | Inoue et al. | |
| 2018/0136318 | A1* | 5/2018 | Uyeno | G01S 7/4815 |
| 2018/0267151 | A1 | 9/2018 | Hall et al. | |
| 2018/0306925 | A1* | 10/2018 | Hosseini | G02B 27/286 |
| 2019/0004151 | A1* | 1/2019 | Abediasl | G01S 7/4817 |
| 2019/0391243 | A1* | 12/2019 | Nicolaescu | G01S 17/42 |

FOREIGN PATENT DOCUMENTS

| | | | |
|---|---|---|---|
| JP | 2017-97340 | A | 6/2017 |
| JP | 2018-49223 | A | 3/2018 |
| WO | WO 2019/031403 | A1 | 2/2019 |

OTHER PUBLICATIONS

Japanese Office Action dated Aug. 31, 2021 in Japanese Patent Application No. 2021-528998.

Japanese Office Action dated Dec. 7, 2021 in Japanese Patent Application No. 2021-528998.

Written Opinion of the International Searching Authority issued in PCT/JP2020/025375 (PCT/ISA/237), dated Sep. 8, 2020.

Extended European Search Report for European Application No. 20942120.5, dated May 10, 2023.

Chinese Office Action and Search Report for Chinese Application No. 202080102195.4, dated Nov. 25, 2024, with an English translation.

* cited by examiner

OPTICAL SCANNING DEVICE AND RANGING APPARATUS

CROSS REFERENCE TO RELATED APPLICATION

This application is a Continuation of PCT International Application No. PCT/JP2020/025375, filed on Jun. 26, 2020, all of which is hereby expressly incorporated by reference into the present application.

TECHNICAL FIELD

The present disclosure relates to an optical scanning device for radiating light toward an object and then reflecting the light reflected by the object, and a ranging apparatus including the optical scanning device.

BACKGROUND ART

Some ranging apparatuses include a ranging apparatus including an optical scanning device for radiating light toward an object and then reflecting the light reflected by the object.

Patent Literature 1 below discloses a micro electro mechanical systems (MEMS) scanner that can be used as the optical scanning device.

The MEMS scanner includes a mirror for reflecting light output from a light source toward an object and then reflecting the light reflected by the object toward an optical receiver. The MEMS scanner further includes an actuator that rotates the mirror about a first shaft and rotates the mirror about a second shaft.

When light is output from the light source toward the mirror, for example, if the actuator rotates the mirror about two shafts as follows, optical scanning can be performed on the object.

First, the actuator changes a rotation angle θx about the first shaft from $\theta x_1$ to $\theta x_2$, and then changes a rotation angle θy about the second shaft by Δθ (hereinafter, referred to as a "first rotational operation"). Next, the actuator changes the rotation angle θx about the first shaft from $\theta x_2$ to $\theta x_1$, and then changes the rotation angle θy about the second shaft by Δθ (hereinafter, referred to as a "second rotational operation"). Then, the actuator alternately repeats the first rotational operation and the second rotational operation.

CITATION LIST

Patent Literature

Patent Literature 1: Japanese National Patent Publication No. 2007-522529

SUMMARY OF INVENTION

Technical Problem

The resolution of the optical scanning with respect to the object depends on the magnitude of Δθ, and the smaller Δθ, the higher the resolution of the optical scanning. However, due to the mechanical structure of the actuator, when a wide viewing angle is to be provided, it is difficult to reduce the deflection angle Δθ for one time, and thus there is a problem that desired resolution cannot be obtained.

The present disclosure has been made to solve the above problem, and an object of the present disclosure is to obtain an optical scanning device capable of enhancing the resolution of optical scanning as compared with an optical scanning device configured to scan light only by causing an actuator to rotate a mirror about two shafts.

Solution to Problem

An optical scanning device according to the present disclosure includes: a light source capable of changing a wavelength or a phase of a light to be output; an optical mode converter connected to an optical waveguide through which the light output from the light source transmits, and configured to continuously change, in accordance with a continuous change in wavelength of the light output from the light source or phase of the light output from the light source, a radiation direction of the light having transmitted through the waveguide; a mirror arranged at a periphery of the optical mode converter, and configured to reflect the light radiated from the optical mode converter and then reflected from an object, toward an optical receiver; and an actuator to rotate the optical mode converter and the mirror about each of two shafts orthogonal to each other.

Advantageous Effects of Invention

According to the present disclosure, the optical scanning device can enhance the resolution of optical scanning as compared with an optical scanning device configured to scan light only by causing an actuator to rotate a mirror about two shafts.

BRIEF DESCRIPTION OF DRAWINGS

FIG. 3 is a hardware configuration diagram of a computer in a case where a distance calculation unit 11 is implemented by software, firmware, or the like.

DESCRIPTION OF EMBODIMENTS

In order to explain the present disclosure in more detail, a mode for carrying out the present disclosure will be described below with reference to the accompanying drawings.

First Embodiment

Figure 1:
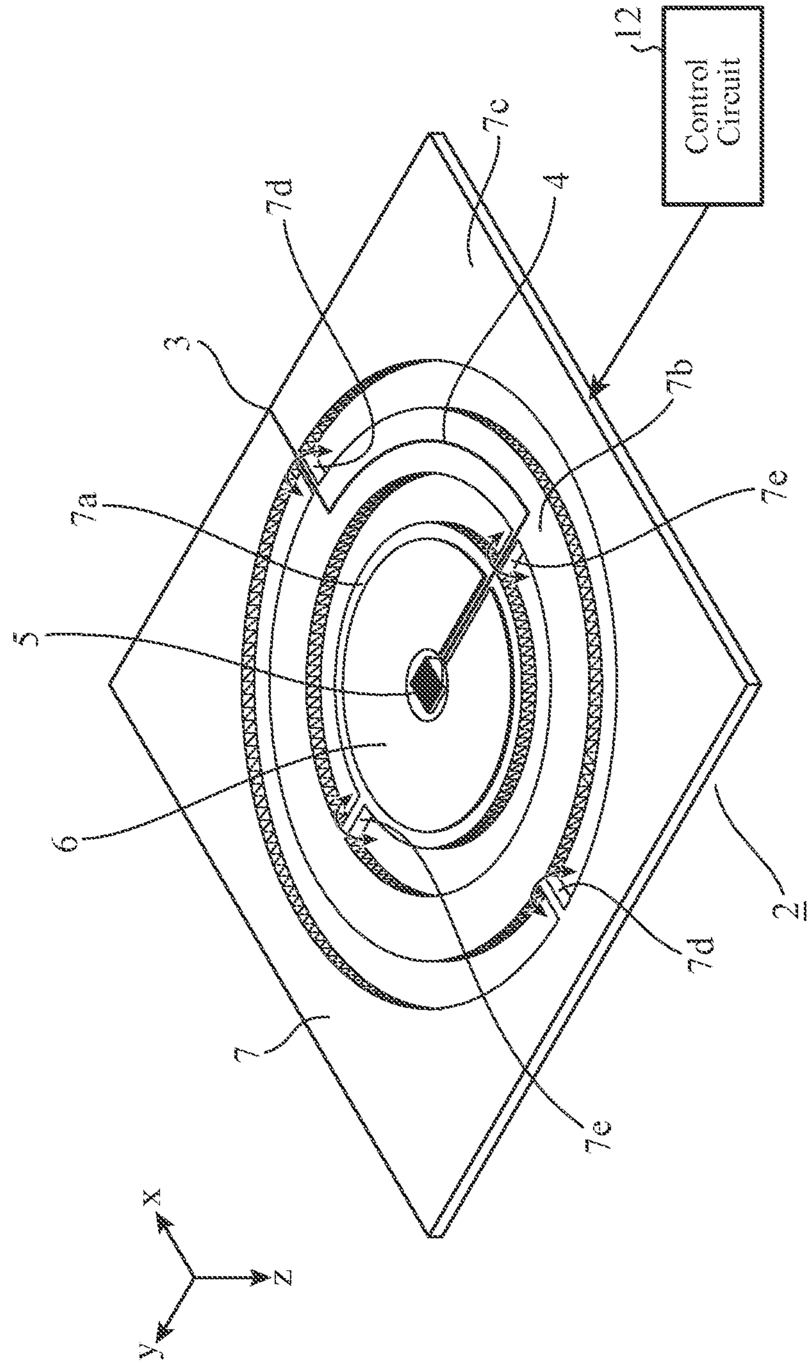
FIG. 1 is a configuration diagram illustrating an optical scanning device 2 according to a first embodiment.

FIG. 1 is a configuration diagram illustrating an optical scanning device 2 according to a first embodiment.

Figure 2:
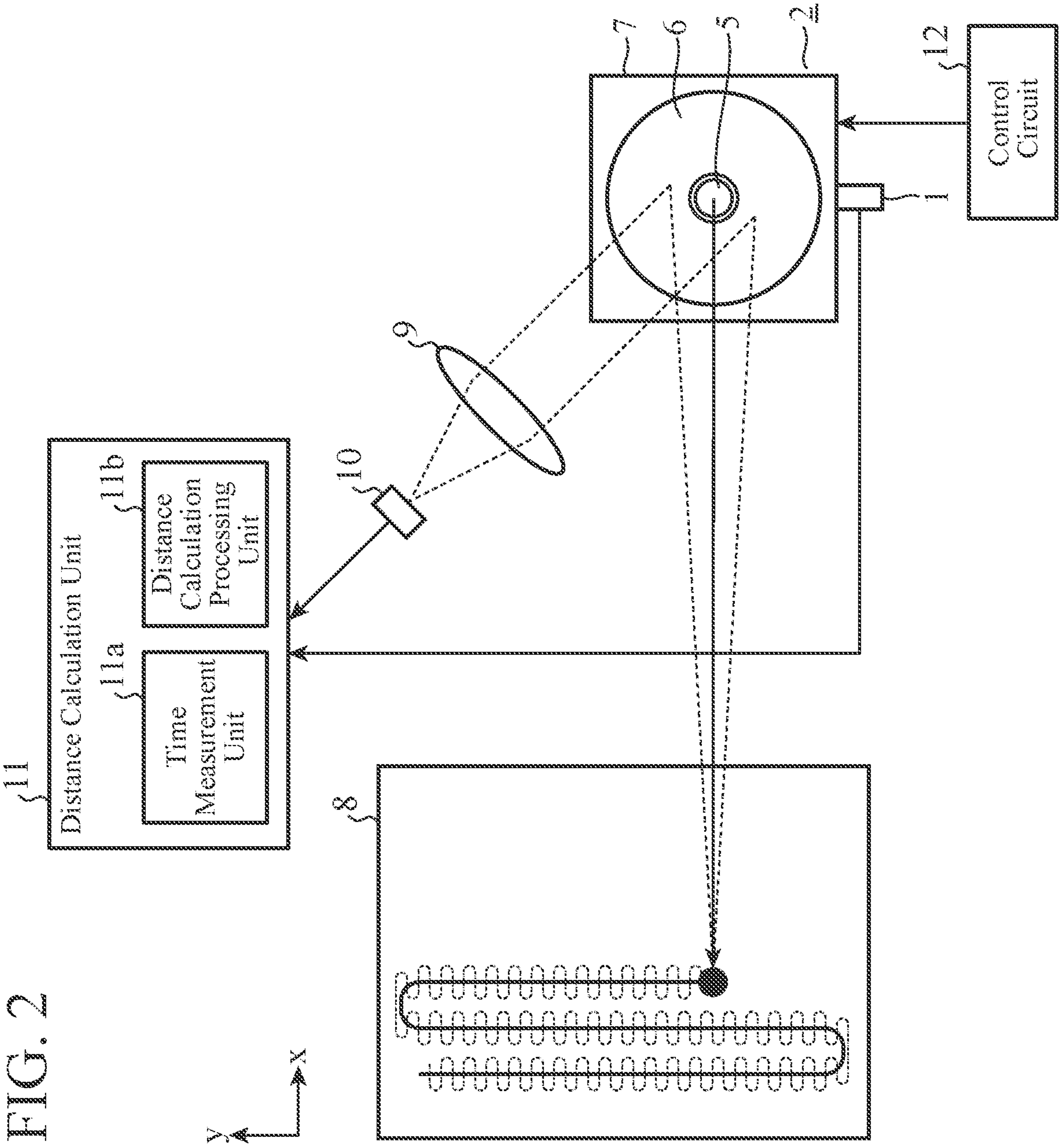
FIG. 2 is a configuration diagram illustrating a ranging apparatus including the optical scanning device 2 according to the first embodiment.

FIG. 2 is a configuration diagram illustrating a ranging apparatus including the optical scanning device 2 according to the first embodiment.

A light source 1 is an oscillator that outputs light to the optical scanning device 2.

The light source 1 can change a wavelength or a phase of light output to the optical scanning device 2.

In addition, the light source 1 outputs a signal (hereinafter, referred to as a "first timing signal") indicating a timing at which the light is output to the optical scanning device 2 to a distance calculation unit 11.

In the ranging apparatus illustrated in FIG. 2, the light source 1 provided outside the optical scanning device 2 is directly connected to the optical scanning device 2. However, this is merely an example, and the light source 1 may be connected to the optical scanning device 2 via an optical fiber or the like.

In addition, the optical scanning device 2 may include the light source 1.

The optical scanning device 2 is installed in a three-dimensional space represented by an x-y-z coordinate system.

The optical scanning device 2 includes an optical input port 3, an optical waveguide 4, an optical mode converter 5, a mirror 6, and an actuator 7.

The optical scanning device 2 is a device for radiating light output from the light source 1 toward an object 8 and then reflecting the light reflected by the object 8.

One end of the optical waveguide 4 is connected to the optical input port 3.

The optical input port 3 receives the light output from the light source 1.

The optical waveguide 4 includes, for example, an optical path formed by a core and a cladding.

One end of the optical waveguide 4 is connected to the optical input port 3, and the other end of the optical waveguide 4 is connected to the optical mode converter 5.

The light received by the optical input port 3 is propagated to the optical mode converter 5 via the optical waveguide 4.

The optical mode converter 5 is implemented by, for example, a grating coupler or an optical phase array.

The optical mode converter 5 changes a radiation direction of light output from the light source 1 in accordance with a change in wavelength or phase of the light output from the light source 1.

Figure 5:
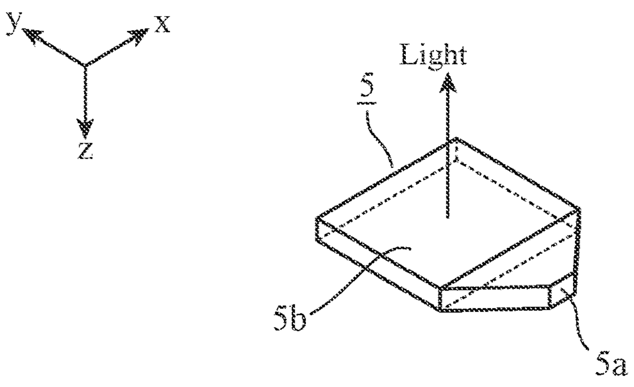
FIG. 5 is an explanatory diagram illustrating a structure of an optical mode converter 5.

As illustrated in FIG. 5, the structure of the optical mode converter 5 is a box-like structure that takes in the light propagated through the optical waveguide 4.

FIG. 5 is an explanatory diagram illustrating the structure of the optical mode converter 5. In FIG. 5, a waveguide connection port 5*a* is an input port connected to the other end of the optical waveguide 4.

Of the inner faces of the box, at least the inner face of a light radiation face 5*b* of the optical mode converter 5 is provided with a grating coupler or an optical phase array. Each of the grating coupler and the optical phase array corresponds to a light transmission type diffraction grating.

The optical mode converter 5 radiates light propagated through the optical waveguide 4 toward the object 8.

Since the grating coupler or the like is provided on the inner face of the box, the radiation direction of the light radiated from the optical mode converter 5 is switched with a change in wavelength of the light output from the light source 1. The direction in which the radiation direction is switched is a direction that intersects with the direction in which the radiation direction is switched with rotation about a first shaft 7*d*, or a direction that intersects with the direction in which the radiation direction is switched with rotation about a second shaft 7*e*.

In the optical mode converter 5 illustrated in FIG. 5, a grating coupler or the like is provided on the inner face of the light radiation face 5*b*. However, this is merely an example, and the optical mode converter 5 may include a converter or the like that switches the radiation direction of the light when the wavelength or the phase of the light output from the light source 1 changes.

The mirror 6 is a device for reflecting light, which is radiated from the optical mode converter 5 and then reflected by the object 8, toward an optical receiver 10 to be described later.

The mirror 6 included in the optical scanning device 2 illustrated in FIG. 1 may be any mirror, for example, a metal mirror or a glass mirror.

The actuator 7 includes a first planar portion 7*a* holding the optical waveguide 4, the optical mode converter 5, and the mirror 6, a second planar portion 7*b* holding the optical waveguide 4, a third planar portion 7*c* holding the optical input port 3, the first shaft 7*d*, and the second shaft 7*e*.

Each of the first planar portion 7*a*, the second planar portion 7*b*, and the third planar portion 7*c* is disposed in parallel with the x-y plane in the drawing.

The planar shape of the first planar portion 7*a* is circular.

The planar shape of the second planar portion 7*b* is a ring, and the first planar portion 7*a* is disposed inside the ring.

The first planar portion 7*a* and the second planar portion 7*b* are connected via the second shaft 7*e*.

The planar shape of the third planar portion 7*c* is rectangular, and a circular hole is provided inside. The second planar portion 7*b* is disposed inside the third planar portion 7*c*.

The second planar portion 7*b* and the third planar portion 7*c* are connected via the first shaft 7*d*.

The first shaft 7*d* is a rotation shaft of the actuator 7 in a direction parallel to the x-axis.

The second shaft 7*e* is a rotation shaft of the actuator 7 orthogonal to the first shaft 7*d*, and is a rotation shaft in a direction parallel to the y-axis.

In the optical scanning device 2 illustrated in FIG. 1, the first shaft 7*d* and the second shaft 7*e* are orthogonal to each other. However, this disclosure is not limited to this example in which the first shaft 7*d* and the second shaft 7*e* are strictly orthogonal to each other, and may be deviated from the orthogonal within a range of causing no problem in a practical use. The term "orthogonal" in the present specification is a concept including an example deviated from the orthogonal within a range of causing no problem in a practical use.

The actuator 7 rotates each of the optical mode converter 5 and the mirror 6 about the first shaft 7*d* and rotates each of the optical mode converter 5 and the mirror 6 about the second shaft 7*e* in accordance with a control signal output from a control circuit 12 described later.

Each of the principle of rotation about the first shaft 7*d* and the principle of rotation about the second shaft 7*e* in the actuator 7 is known (See, for example, Patent Literature 1).

In the optical scanning device 2 illustrated in FIG. 1, the planar shape of the first planar portion 7*a* is circular. However, this is merely an example, and for example, the planar shape of the first planar portion 7*a* may be rectangular. When the planar shape of the first planar portion 7*a* is rectangular, the planar shape of the second planar portion 7*b* is a rectangular ring, and the inner hole shape of the third planar portion 7*c* is rectangular.

The object 8 is an object to be ranged by the ranging apparatus illustrated in FIG. 2.

The object 8 is installed in the same three-dimensional space as the optical scanning device 2.

In FIG. 2, in order to simplify the drawing, the shape of the object 8 is drawn to be a planar shape. However, in practice, the shape of the object 8 is three-dimensional, and the face facing the optical scanning device 2 among the faces of the object 8 is optically scanned by the optical scanning device 2.

In the ranging apparatus illustrated in FIG. 2, in order to simplify the description, the three-dimensional space in which the optical scanning device 2 is installed and the three-dimensional space in which the object 8 is installed are represented in the same coordinate system. In a case where the coordinate system (hereinafter, referred to as a "first coordinate system") of the three-dimensional space in which the optical scanning device 2 is installed and the coordinate system (hereinafter, referred to as a "second coordinate system") of the three-dimensional space in which the object 8 is installed are separately represented, the x-axis direction in the first coordinate system and the x-axis direction in the second coordinate system are not necessarily the same direction. In addition, the y-axis direction in the first coordinate system and the y-axis direction in the second coordinate system are not necessarily the same direction.

A lens 9 is an optical element for condensing the light reflected by the mirror 6 on the optical receiver 10.

The optical receiver 10 receives the light condensed by the lens 9.

Further, the optical receiver 10 outputs a signal (hereinafter, referred to as a "second timing signal") indicating the timing of receiving the light to the distance calculation unit 11.

By disposing the optical receiver 10 in the vicinity of the mirror, the optical receiver 10 may directly receive the reflected light without passing through the mirror. In this case, the mirror is unnecessary.

The distance calculation unit 11 is implemented by, for example, a distance calculation circuit.

The distance calculation unit 11 includes a time measurement unit 11*a* and a distance calculation processing unit 11*b*.

The distance calculation unit 11 calculates the distance from the optical scanning device 2 to the object 8 on the basis of the time from when the first timing is received from the light source 1 to when the second timing is received from the optical receiver 10.

The time measurement unit 11*a* measures a time from when light is radiated from the optical mode converter 5 to when the reflected light is received by the optical receiver 10. That is, the time measurement unit 11*a* measures the time from when the first timing is received from the light source 1 to when the second timing is received from the optical receiver 10.

The distance calculation processing unit 11*b* calculates the distance from the optical scanning device 2 to the object 8 on the basis of the time measured by the time measurement unit 11*a*.

The control circuit 12 is provided outside the optical scanning device 2.

The control circuit 12 controls each of a rotational operation around the first shaft 7*d* and a rotational operation around the second shaft 7*e* in the actuator 7.

In FIG. 1, it is assumed that the distance calculation unit 11 which is a component of the ranging apparatus is implemented by a distance calculation circuit which is dedicated hardware.

The distance calculation circuit corresponds to, for example, a single circuit, a composite circuit, a programmed processor, a parallel programmed processor, an application specific integrated circuit (ASIC), a field-programmable gate array (FPGA), or a combination thereof.

The disclosure is not limited to this example in which the distance calculation unit 11 is implemented by dedicated hardware, and the distance calculation unit 11 may be implemented by software, firmware, or a combination of software and firmware.

The software or firmware is stored in a memory of a computer as a program. The computer means hardware that executes a program, and corresponds to, for example, a central processing unit (CPU), a central processing device, a processing unit, an arithmetic unit, a microprocessor, a microcomputer, a processor, or a digital signal processor (DSP).

Figure 3:
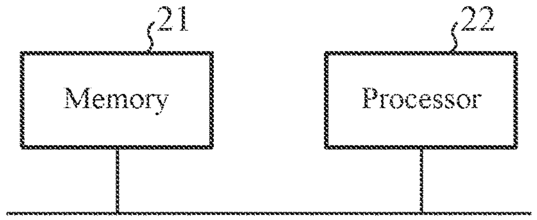

FIG. 3 is a hardware configuration diagram of a computer in a case where the distance calculation unit 11 is implemented by software, firmware, or the like.

In a case where the distance calculation unit 11 is implemented by software, firmware, or the like, a program for causing a computer to execute a processing procedure performed by the distance calculation unit 11 is stored in a memory 21. Then, a processor 22 of the computer executes the program stored in the memory 21.

Next, the operation of the ranging apparatus illustrated in FIG. 2 will be described.

The light source 1 outputs light to the optical input port 3 of the optical scanning device 2.

In addition, the light source 1 outputs a first timing signal indicating a timing at which light is output to the distance calculation unit 11.

The optical input port 3 receives the light output from the light source 1. The light received by the optical input port 3 is propagated to the optical mode converter 5 via the optical waveguide 4.

The optical mode converter 5 radiates light propagated through the optical waveguide 4 toward the object 8.

The light radiated from the optical mode converter 5 is reflected by the object 8.

The mirror 6 reflects the light radiated from the optical mode converter 5 and then reflected by the object 8 toward the optical receiver 10.

The lens 9 condenses the light reflected by the mirror 6 on the optical receiver 10.

The optical receiver 10 receives the light condensed by the lens 9, and outputs a second timing signal indicating the timing of receiving the light to the distance calculation unit 11.

The distance calculation unit 11 calculates a time T from when the light is output to when the light is received from the time is when the first timing signal is received from the light source 1 and the time $t_r$ when the second timing signal is received from the optical receiver 10 as expressed in the following Formula (1).

$$T=t_r-t_s \tag{1}$$

Next, the distance calculation unit 11 calculates the distance L from the optical scanning device 2 to the position hit by the light in the object 8 using the calculated time T as expressed in the following Formula (2).

$$L=\frac{c\times T}{2} \tag{2}$$

In Formula (2), c represents the speed of light.

In order to be able to calculate the distance L to a plurality of positions on the face of the object 8, the actuator 7 rotates each of the optical mode converter 5 and the mirror 6 about the first shaft 7*d*. Further, the actuator 7 rotates each of the optical mode converter 5 and the mirror 6 about the second shaft 7*e*.

Figure 4:
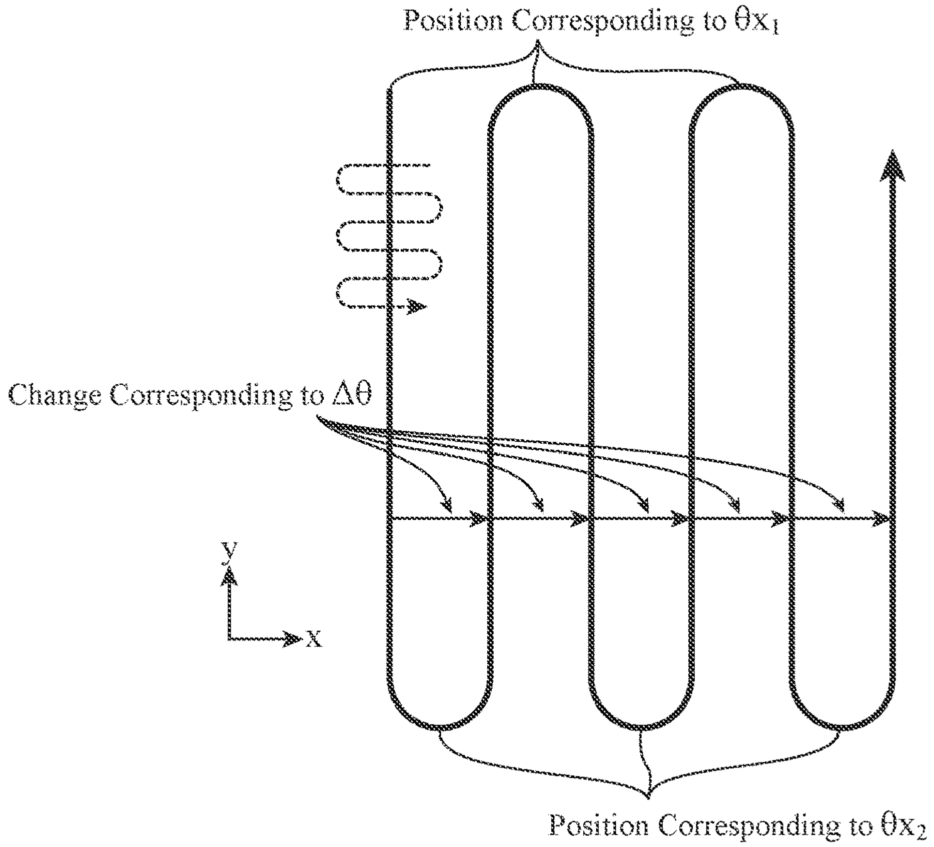
FIG. 4 is an explanatory diagram illustrating an example of a scanning trajectory of light.

By the actuator 7 rotating each of the optical mode converter 5 and the mirror 6, it is possible to scan the light as indicated by the solid line in FIG. 4.

FIG. 4 is an explanatory diagram illustrating an example of a scanning trajectory of light.

The scanning trajectory of light illustrated in FIG. 4 appears in a case where the actuator 7 rotates each of the optical mode converter 5 and the mirror 6 as follows when light is output from the light source 1.

First, the actuator 7 moves the position of the light striking the face of the object 8 in a direction parallel to the y-axis by changing the rotation angle θx around the first shaft 7*d* from $\theta x_1$ to $\theta x_2$ (hereinafter, referred to as a "first rotational operation"). Note that the distance calculation unit 11 calculates the distance L at a plurality of positions while the first rotational operation is being performed.

Next, the actuator 7 changes the position in the x-axis direction of the light striking the face of the object 8 by changing the rotation angle θy around the second shaft 7*e* by Δθ (hereinafter, referred to as a "second rotational operation"). Note that the distance calculation unit 11 calculates the distance L at a plurality of positions while the second rotational operation is being performed. Hereinafter, a set of the first rotational operation and the second rotational operation is referred to as first optical scanning.

In the example of FIG. 4, since the actuator 7 changes the rotation angle θy around the second shaft 7*e* just before the end of the first rotational operation, the scanning trajectory of the light draws a curve. In a case where the actuator 7 changes the rotation angle θy around the second shaft 7*e* after the first rotational operation is ended, the position of the light striking the face of the object 8 changes in a direction parallel to the x-axis.

Next, the actuator 7 moves the position of the light striking the face of the object 8 in a direction parallel to the y-axis by changing the rotation angle θx around the first shaft 7*d* from $\theta x_2$ to $\theta x_1$ (hereinafter, referred to as a "third rotational operation"). Note that the distance calculation unit 11 calculates the distance L at a plurality of positions while the third rotational operation is being performed.

Next, the actuator 7 changes the position in the x-axis direction of the light striking the face of the object 8 by changing the rotation angle θy around the second shaft 7*e* by Δθ (hereinafter, referred to as a "fourth rotational operation"). Note that the distance calculation unit 11 calculates the distance L at a plurality of positions while the fourth rotational operation is being performed. Hereinafter, a set of the third rotational operation and the fourth rotational operation is referred to as second optical scanning.

In the example of FIG. 4, since the actuator 7 changes the rotation angle θy around the second shaft 7*e* just before the end of the third rotational operation, the scanning trajectory of the light draws a curve. In a case where the actuator 7 changes the rotation angle θy around the second shaft 7*e* after the third rotational operation is ended, the position of the light striking the face of the object 8 changes in a direction parallel to the x-axis.

The actuator 7 alternately and repeatedly performs the first optical scanning and the second optical scanning, so that the light scanning as indicated by the solid line in FIG. 4 is implemented. The actuator 7 may simultaneously perform both the first optical scanning and the second optical scanning.

The light source 1 can change a wavelength or a phase of light output to the optical scanning device 2.

In the ranging apparatus illustrated in FIG. 2, the light source 1 itself changes the wavelength or the phase of light. However, this is merely an example, and the light source 1 may change the wavelength or the phase of light in accordance with the control signal output from the control circuit 12.

The light source 1 changes the wavelength or the phase of the light output to the optical scanning device 2 to change the radiation direction of the light radiated from the optical mode converter 5.

The direction in which the radiation direction is switched is a direction that intersects with the direction in which the radiation direction is switched with rotation about the first shaft 7*d*, or a direction that intersects with the direction in which the radiation direction is switched with rotation about the second shaft 7*e*.

The dotted line illustrated in FIG. 4 indicates a scanning trajectory of light that appears as the radiation direction of light radiated from the optical mode converter 5 changes. The example of FIG. 4 illustrates that the direction in which the radiation direction is switched is a direction that intersects with the direction in which the radiation direction is switched with rotation about the first shaft 7*d*.

FIG. 2 illustrates that the direction in which the radiation direction is switched is both a direction that intersects the direction in which the radiation direction is switched with rotation about the first shaft 7*d* and a direction that intersects the direction in which the radiation direction is switched with rotation about the second shaft 7*e*.

For example, the light scanning trajectory as indicated by the dotted line in FIG. 4 appears, so that the resolution of the optical scanning in the direction parallel to the x-axis in the optical scanning device 2 is enhanced.

In the first embodiment described above, the optical scanning device 2 is configured to include the optical mode converter 5 that changes the radiation direction of the light in accordance with the change in wavelength or phase of the light output from the light source 1, and the actuator 7 that rotates the optical mode converter 5 about each of two shafts orthogonal to each other. Thus, the optical scanning device 2 can enhance the resolution of optical scanning as compared with an optical scanning device configured to scan light only by causing an actuator to rotate a mirror about two shafts.

In the optical scanning device 2 illustrated in FIG. 1, a rotation shaft in a direction parallel to the x-axis is the first shaft 7*d*, and a rotation shaft in a direction parallel to the y-axis is the second shaft 7*e*. However, this is merely an example, and the rotation shaft in the direction parallel to the x-axis may be the second shaft 7*e* and the rotation shaft in the direction parallel to the y-axis may be the first shaft 7*d*.

The ranging apparatus illustrated in FIG. 2 includes one optical receiver 10. However, this is merely an example, and for example, in a case where the reflection direction of light by the mirror 6 greatly changes, the plurality of optical receivers 10 may be arrayed one-dimensionally along the reflection direction of light as illustrated in FIG. 6.

Figure 6:
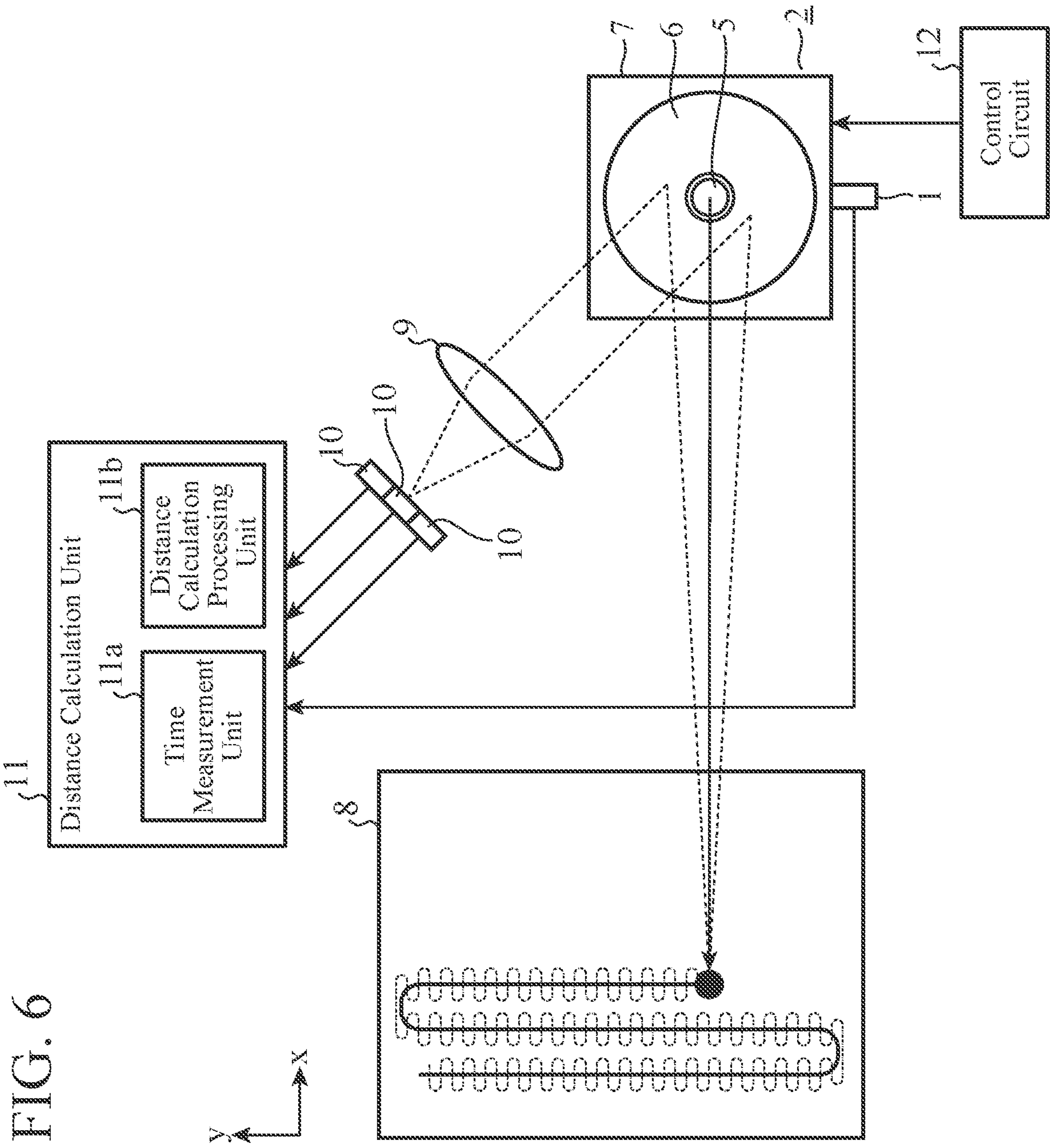
FIG. 6 is a configuration diagram illustrating another ranging apparatus including the optical scanning device 2 according to the first embodiment.

FIG. 6 is a configuration diagram illustrating another ranging apparatus including the optical scanning device 2 according to the first embodiment.

Second Embodiment

In a second embodiment, an optical scanning device 2 in which an optical waveguide 4' is branched into a plurality of branches, and optical mode converters 5-1, 5-2, and 5-3 are connected to a plurality of branch destinations 4*a*, 4*b*, and 4*c*, respectively, in the optical waveguide 4' will be described.

Figure 7:
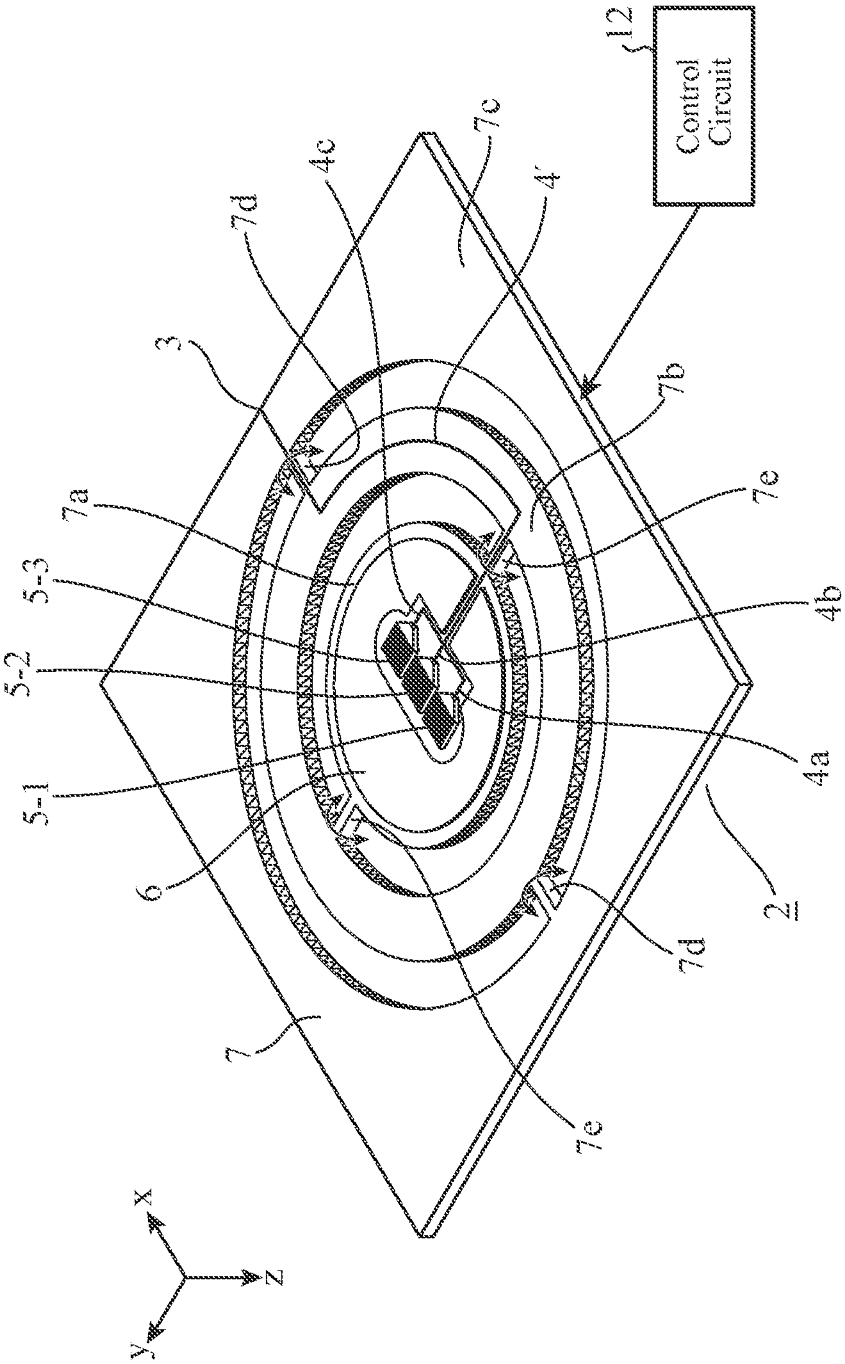
FIG. 7 is a configuration diagram illustrating an optical scanning device 2 according to a second embodiment.

FIG. 7 is a configuration diagram illustrating an optical scanning device 2 according to the second embodiment. In FIG. 7, the same reference numerals as those in FIG. 1 denote the same or corresponding parts, and thus description thereof is omitted.

The optical waveguide 4' includes, for example, an optical path formed by a core and a cladding.

One end of the optical waveguide 4' is connected to the optical input port 3, and the other end of the optical waveguide 4' is branched into a plurality of branches.

In the optical scanning device 2 illustrated in FIG. 7, the other end of the optical waveguide 4' is branched into three. However, this is merely an example, and the other end of the optical waveguide 4' may be branched into two or four or more.

The optical mode converters 5-1, 5-2, and 5-3 are connected to the three branch destinations 4*a*, 4*b*, and 4*c*, respectively, at the other end of the optical waveguide 4'.

Each of the optical mode converters 5-1, 5-2, and 5-3 is an optical mode converter similar to the optical mode converter 5 illustrated in FIG. 2.

In the optical scanning device 2 illustrated in FIG. 7, the optical mode converters 5-1, 5-2, and 5-3 are arranged at positions that are different from each other and in directions that are different from each other with respect to the first planar portion 7*a*. Therefore, even if both the wavelengths and the phases of lights output from the light source 1 to the optical mode converters 5-1, 5-2, and 5-3 are the same as each other, the directions of the lights radiated from the optical mode converters 5-1, 5-2, and 5-3 are different from each other. Therefore, the lights radiated from the optical mode converters 5-1, 5-2, and 5-3 strike positions that are different from each other with respect to the object 8. The wavelengths or phases of the lights output from the light source 1 to the optical mode converters 5-1, 5-2, and 5-3 may be different from each other. Even in this case, the lights radiated from the optical mode converters 5-1, 5-2, and 5-3 strike positions that are different from each other with respect to the object 8.

In a case where the optical mode converters 5-1, 5-2, and 5-3 are arranged in directions that are different from each other, a plurality of optical receivers 10 may be used as illustrated in FIG. 6. The optical receivers 10 are arranged at positions and configured to receive lights radiated from the respective optical mode converters 5-1, 5-2, and 5-3 and then reflected by the object 8.

The first planar portion 7*a* of the actuator 7 holds the optical mode converters 5-1, 5-2, and 5-3 and the mirror 6.

The actuator 7 rotates each of the optical mode converters 5-1, 5-2, and 5-3 and the mirror 6 about the first shaft 7*d*, and rotates each of the optical mode converters 5-1, 5-2, and 5-3 and the mirror 6 about the second shaft 7*e*.

Figure 8:
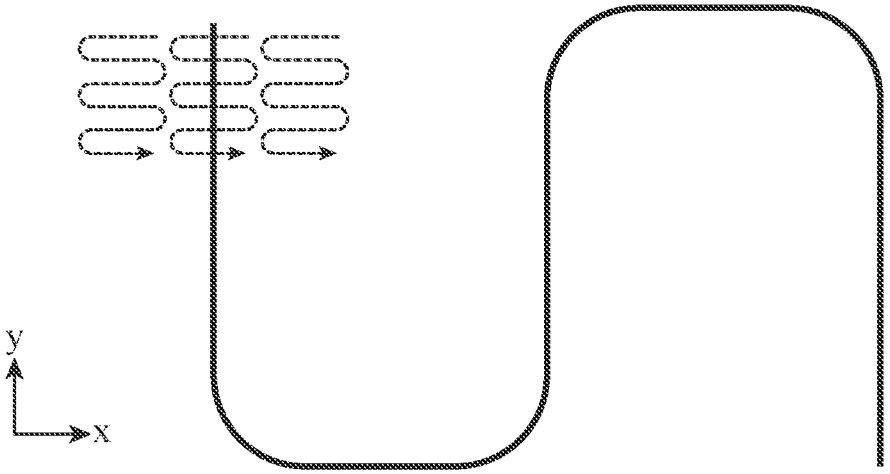
FIG. 8 is an explanatory diagram illustrating an example of a scanning trajectory of light.

FIG. 8 is an explanatory diagram illustrating an example of a scanning trajectory of light.

Similarly to the first embodiment, the actuator 7 scans light as indicated by the solid line in FIG. 8 by alternately and repeatedly performing the first optical scanning and the second optical scanning.

The radiation directions of lights radiated from the optical mode converters 5-1, 5-2, and 5-3 change by the light source 1 changing the wavelengths or the phases of lights output to the optical scanning device 2.

As the radiation directions of the lights radiated from the optical mode converters 5-1, 5-2, and 5-3 change, a scanning trajectory of the light as indicated by the dotted line in FIG. 8 appears. The appearance of the scanning trajectory of the light as indicated by the dotted line in FIG. 8 enhances the resolution of the optical scanning in the direction parallel to the x-axis in the optical scanning device 2.

In the second embodiment described above, the optical scanning device 2 illustrated in FIG. 7 is configured in such a manner that the optical waveguide 4' is branched into a plurality of branches, the optical mode converters 5-1, 5-2, and 5-3 are connected to the plurality of branch destinations 4*a*, 4*b*, and 4*c*, respectively, in the optical waveguide 4', and the actuator 7 rotates each of the optical mode converters 5-1, 5-2, and 5-3 and the mirror 6 about the first shaft 7*d* and rotates each of the optical mode converters 5-1, 5-2, and 5-3 and the mirror 6 about the second shaft 7*e*. Therefore, the optical scanning device 2 illustrated in FIG. 7 can enhance the resolution of the optical scanning as compared with an optical scanning device configured to scan light only by causing an actuator to rotate a mirror about two shafts. In addition, the optical scanning device 2 illustrated in FIG. 7 can perform optical scanning of the entire face facing the optical scanning device 2 among the faces of the object 8 even if the operation of rotation about the second shaft 7*e* in the actuator 7 is reduced as compared with the optical scanning device 2 illustrated in FIG. 2.

Third Embodiment

In a third embodiment, an optical scanning device 2 including a plurality of optical waveguides 4-1, 4-2, and 4-3 and a plurality of optical mode converters 5-1, 5-2, and 5-3 will be described.

Figure 9:
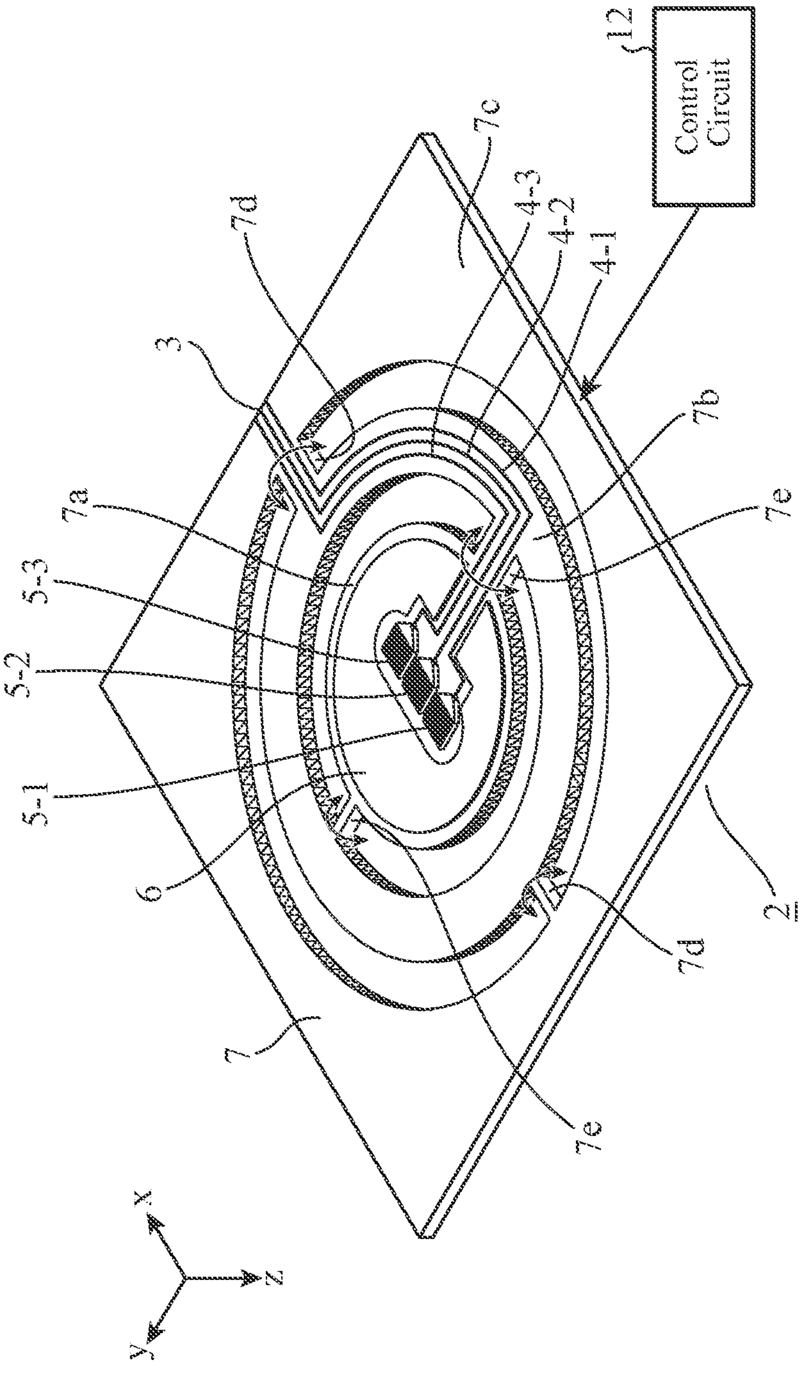
FIG. 9 is a configuration diagram illustrating an optical scanning device 2 according to a third embodiment.

FIG. 9 is a configuration diagram illustrating the optical scanning device 2 according to the third embodiment. In FIG. 9, the same reference numerals as those in FIGS. 1 and 7 denote the same or corresponding parts, and thus description thereof is omitted.

The optical waveguides 4-1, 4-2, and 4-3 include, for example, an optical path formed by a core and a cladding.

One end of each of the optical waveguides 4-1, 4-2, and 4-3 is connected to one light source 1 via the optical input port 3.

The other end of the optical waveguide 4-1 is connected to the optical mode converter 5-1, and the other end of the optical waveguide 4-2 is connected to the optical mode converter 5-2. In addition, the other end of the optical waveguide 4-3 is connected to the optical mode converter 5-3.

The optical mode converters 5-1, 5-2, and 5-3 may be arranged in the same direction or may be arranged in directions different from each other.

The optical scanning device 2 illustrated in FIG. 9 includes the optical waveguides 4-1, 4-2, and 4-3 and the optical mode converters 5-1, 5-2, and 5-3. However, this is merely an example, and the number of the optical waveguides 4 included in the optical scanning device 2 illustrated in FIG. 9 and the number of the optical mode converters 5 included in the optical scanning device 2 may be two or four or more.

When the optical scanning device 2 includes the optical waveguides 4-1, 4-2, and 4-3 and the optical mode converters 5-1, 5-2, and 5-3, the same effects as those of the optical scanning device 2 illustrated in FIG. 7 can be obtained.

Figure 10:
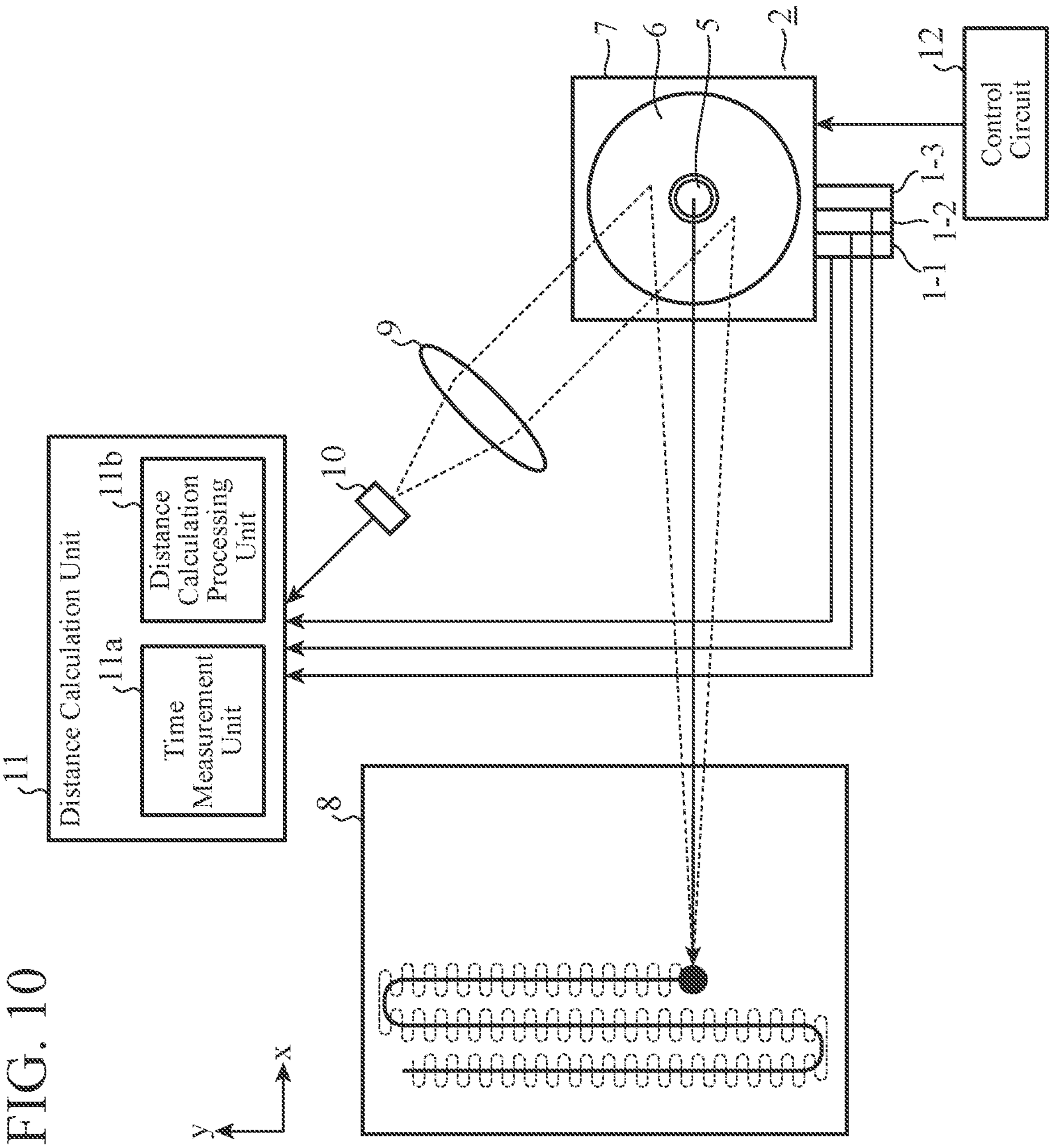
FIG. 10 is a configuration diagram illustrating a ranging apparatus including the optical scanning device 2 according to the third embodiment.

FIG. 10 is a configuration diagram illustrating a ranging apparatus including the optical scanning device 2 according to the third embodiment. In FIG. 10, the same reference numerals as those in FIG. 2 denote the same or corresponding parts, and thus description thereof is omitted.

The ranging apparatus illustrated in FIG. 10 includes the optical scanning device 2 illustrated in FIG. 9.

Each of the light sources 1-1, 1-2, and 1-3 is a light source similar to the light source 1 illustrated in FIG. 2.

The light source 1-1 outputs light to the optical mode converter 5-1 via the optical waveguide 4-1, and the light source 1-2 outputs light to the optical mode converter 5-2 via the optical waveguide 4-2. In addition, the light source 1-3 outputs light to the optical mode converter 5-3 via the optical waveguide 4-3.

When outputting light, each of the light sources 1-1, 1-2, and 1-3 notifies the distance calculation unit 11 that light has been output.

The light sources 1-1, 1-2, and 1-3 output lights having different wavelengths from each other or lights having different phases from each other.

That is, the light source 1-1 outputs the light having the wavelength $\lambda_1$ to the optical mode converter 5-1, the light source 1-2 outputs the light having the wavelength $\lambda_2$ to the optical mode converter 5-2, and the light source 1-3 outputs the light having the wavelength $\lambda_3$ to the optical mode converter 5-3.

Further, the light source 1-1 changes the wavelength $\lambda_1$ in a range of, for example, $(\lambda_1-\Delta\lambda_1)$ to $(\lambda_1+\Delta\lambda_1)$, the light source 1-2 changes the wavelength $\lambda_2$ in a range of, for example, $(\lambda_2-\Delta\lambda_2)$ to $(\lambda_2+\Delta\lambda_2)$, and the light source 1-3 changes the wavelength $\lambda_3$ in a range of, for example, $(\lambda_3-\Delta\lambda_3)$ to $(\lambda_3+\Delta\lambda_3)$.

Alternatively, the light source 1-1 outputs the light having the phase $\theta_1$ to the optical mode converter 5-1, the light source 1-2 outputs the light having the phase $\theta_2$ to the optical mode converter 5-2, and the light source 1-3 outputs the light having the phase $\theta_3$ to the optical mode converter 5-3.

Furthermore, the light source 1-1 changes the phase $\theta_1$, for example, in a range of $(\theta_1-\Delta\theta_1)$ to $(\theta_1+\Delta\theta_1)$, the light source 1-2 changes the phase $\theta_2$, for example, in a range of $(\theta_2-\Delta\theta_2)$ to $(\theta_2+\Delta\theta_2)$, and the light source 1-3 changes the phase $\theta_3$, for example, in a range of $(\theta_3-\Delta\theta_3)$ to $(\theta_3+\Delta\theta_3)$.

The time measurement unit 11*a* of the distance calculation unit 11 measures the time from when the light is radiated from each of the optical mode converters 5-1, 5-2, and 5-3 to when the reflected light is received by each of the optical mode converters 5-1, 5-2, and 5-3.

The distance calculation processing unit 11*b* calculates the distance from the optical scanning device 2 to the object 8 on the basis of each time measured by the time measurement unit 11*a*.

In the third embodiment described above, the ranging apparatus includes the plurality of light sources 1-1, 1-2, and 1-3, and the light sources 1-1, 1-2, and 1-3 are configured to output lights having mutually different wavelengths or lights having mutually different phases. Therefore, the switching directions of the radiation directions of the lights radiated from the optical mode converters 5-1, 5-2, and 5-3 can be set to different switching directions from each other.

In the ranging apparatus illustrated in FIG. 10, the light sources 1-1, 1-2, and 1-3 output lights having different wavelengths from each other or lights having different phases from each other.

Fourth Embodiment

In a fourth embodiment, an optical scanning device 2 including an optical demultiplexer 13 that demultiplexes light propagated through an optical waveguide 4 for each wavelength will be described.

Figure 11:
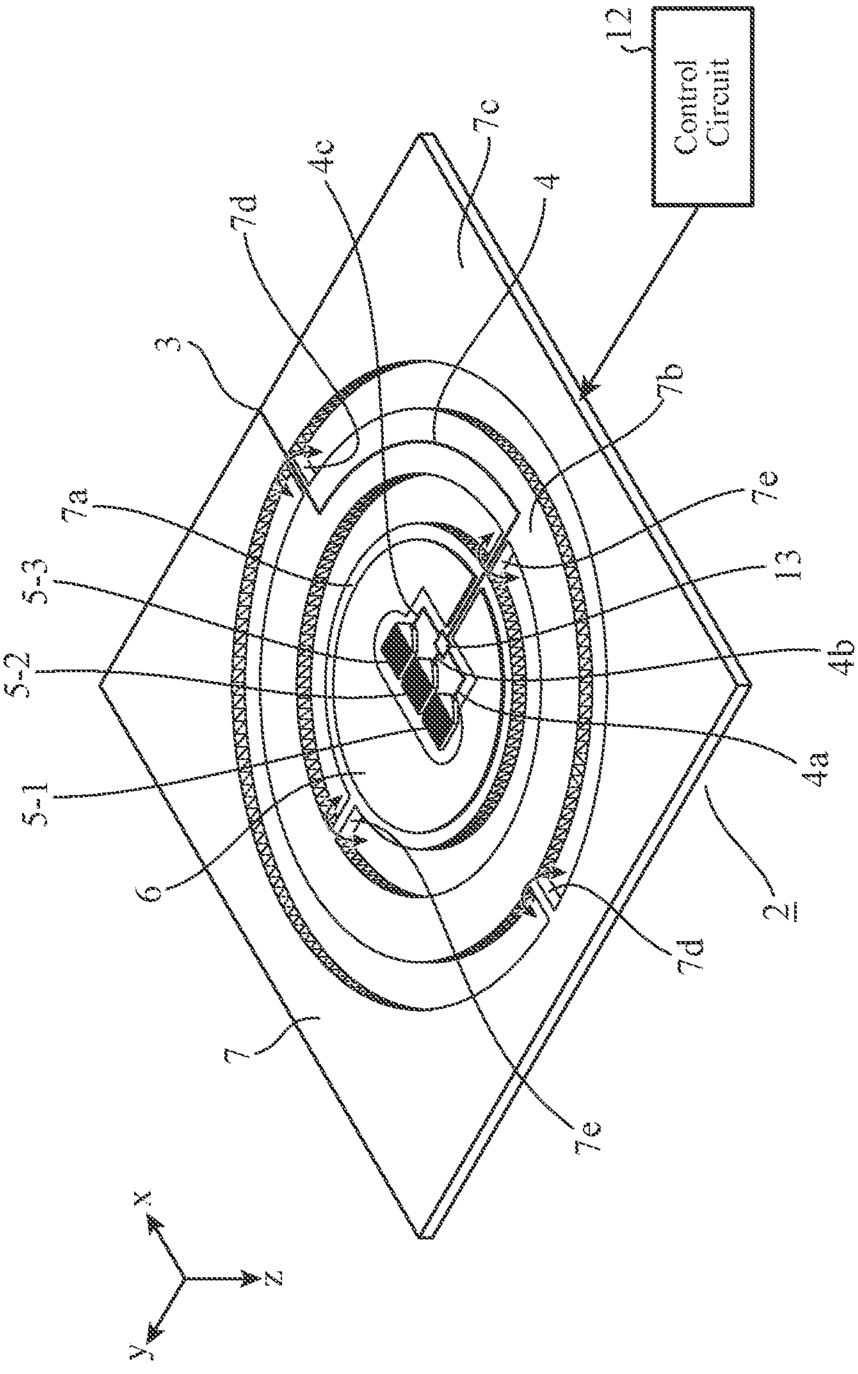
FIG. 11 is a configuration diagram illustrating an optical scanning device 2 according to a fourth embodiment.

FIG. 11 is a configuration diagram illustrating the optical scanning device 2 according to the fourth embodiment. In FIG. 11, the same reference numerals as those in FIGS. 1 and 7 denote the same or corresponding parts, and thus description thereof is omitted.

The optical demultiplexer 13 is inserted in the middle of the optical waveguide 4.

The optical demultiplexer 13 demultiplexes the light propagated through the optical waveguide 4 for each wavelength.

When light including a plurality of wavelengths $\lambda_1$, $\lambda_2$, and $\lambda_3$ is output from the light source 1, the optical demultiplexer 13 demultiplexes the light propagated through the optical waveguide 4 for each wavelength. For example, the optical demultiplexer 13 outputs the light having the wavelength $\lambda_1$ to the optical mode converter 5-1, outputs the light having the wavelength $\lambda_2$ to the optical mode converter 5-2, and outputs the light having the wavelength $\lambda_3$ to the optical mode converter 5-3.

In the fourth embodiment described above, the optical scanning device 2 illustrated in FIG. 11 is configured to include the optical demultiplexer 13 that is inserted in the middle of the optical waveguide 4 and demultiplexes the light propagated through the optical waveguide 4 for each wavelength, and the plurality of optical mode converters 5-1, 5-2, and 5-3 that radiate a plurality of lights demultiplexed by the optical demultiplexer 13 toward the object 8 as the optical mode converter 5. Therefore, the optical scanning device 2 illustrated in FIG. 11 can enhance the resolution of the optical scanning as compared with an optical scanning device configured to scan light only by causing an actuator to rotate a mirror about two shafts. In addition, the optical scanning device 2 illustrated in FIG. 11 can perform optical scanning of the entire face facing the optical scanning device 2 among the faces of the object 8 even if the operation of rotation about the second shaft 7*e* in the actuator 7 is reduced as compared with the optical scanning device 2 illustrated in FIG. 2. Furthermore, the switching directions of the radiation directions of the lights radiated from the optical mode converters 5-1, 5-2, and 5-3 can be set to different switching directions from each other.

Fifth Embodiment

In a fifth embodiment, an optical scanning device 2 in which, instead of mounting the mirror 6, an optical mode converter 5' receives light reflected by an object 8 and outputs the received light to an optical waveguide 4 will be described.

Figure 12:
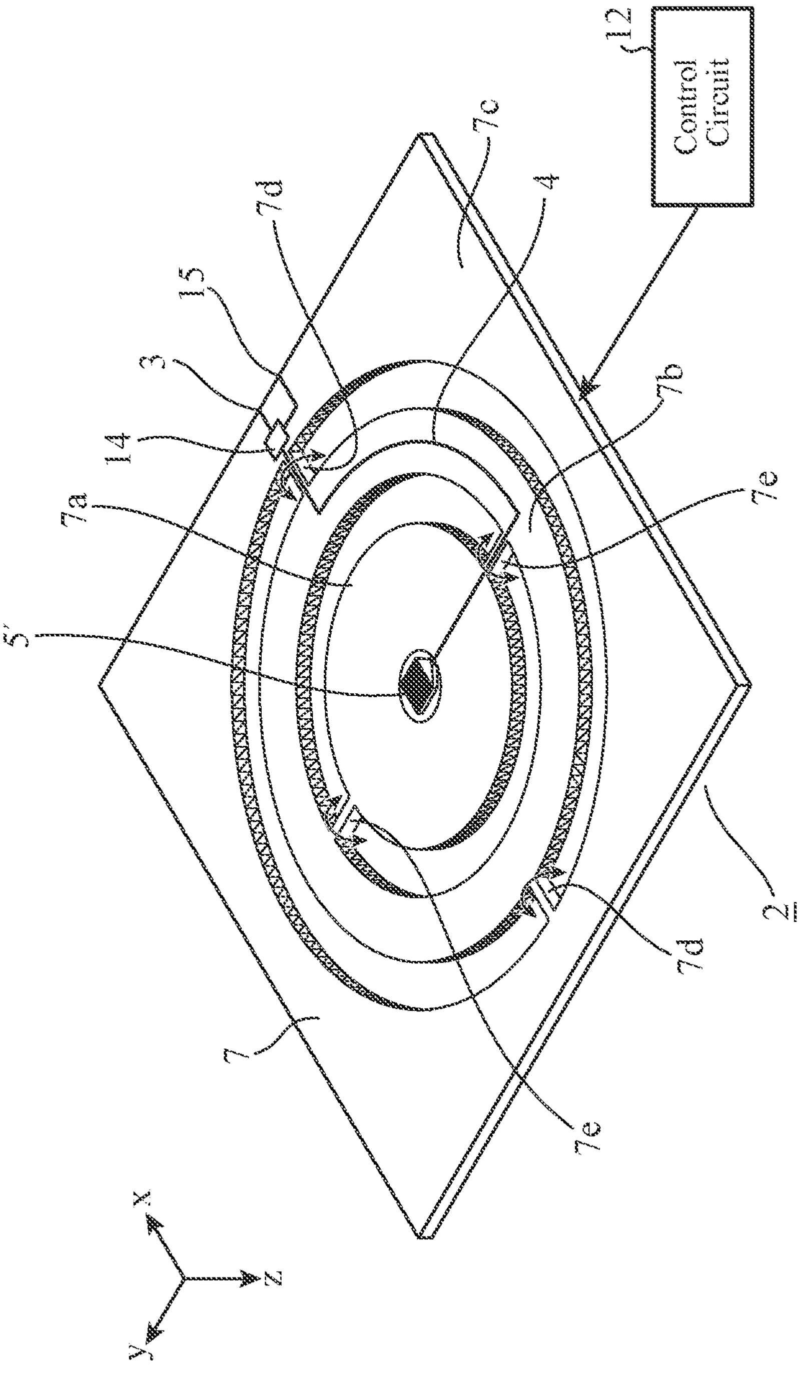
FIG. 12 is a configuration diagram illustrating an optical scanning device 2 according to a fifth embodiment.

FIG. 12 is a configuration diagram illustrating the optical scanning device 2 according to the fifth embodiment. In FIG. 12, the same reference numerals as those in FIG. 1 denote the same or corresponding parts, and thus description thereof is omitted.

The optical mode converter 5' is an optical mode converter having a structure similar to that of the optical mode converter 5 illustrated in FIG. 1, and radiates light propagated through the optical waveguide 4 toward the object 8.

Unlike the optical mode converter 5 illustrated in FIG. 1, the optical mode converter 5' radiates light toward the object 8, receives light reflected by the object 8, and outputs the received light to the optical waveguide 4.

An optical circulator 14 is inserted into the optical waveguide 4.

The optical circulator 14 outputs the light output from the light source 1 to the optical mode converter 5' via the optical waveguide 4.

In addition, the optical circulator 14 outputs the light output from the optical mode converter 5' to the optical receiver 10 via an optical output port 15 described later.

The optical output port 15 is connected to the optical receiver 10 via, for example, an optical fiber.

In the optical scanning device 2 illustrated in FIG. 12, since the optical mode converter 5' is connected to the optical receiver 10 via the optical waveguide 4, the optical circulator 14, and the optical output port 15, the ranging apparatus does not need to include the lens 9.

Note that the light received by the optical mode converter 5' is propagated to the optical receiver 10 via the optical waveguide 4, the optical circulator 14, and the optical output port 15.

In the ranging apparatus according to the embodiments 1 to 5, the light source 1 or the light sources 1-1, 1-2, and 1-3 always change the wavelength of light output to the optical mode converter 5 or the like or the phase of light output to the optical mode converter 5 or the like.

However, this is merely an example, and the light source 1 or the light sources 1-1, 1-2, and 1-3 may temporarily change the wavelength of light output to the optical mode converter 5 or the like or the phase of light output to the optical mode converter 5 or the like.

Figure 13:
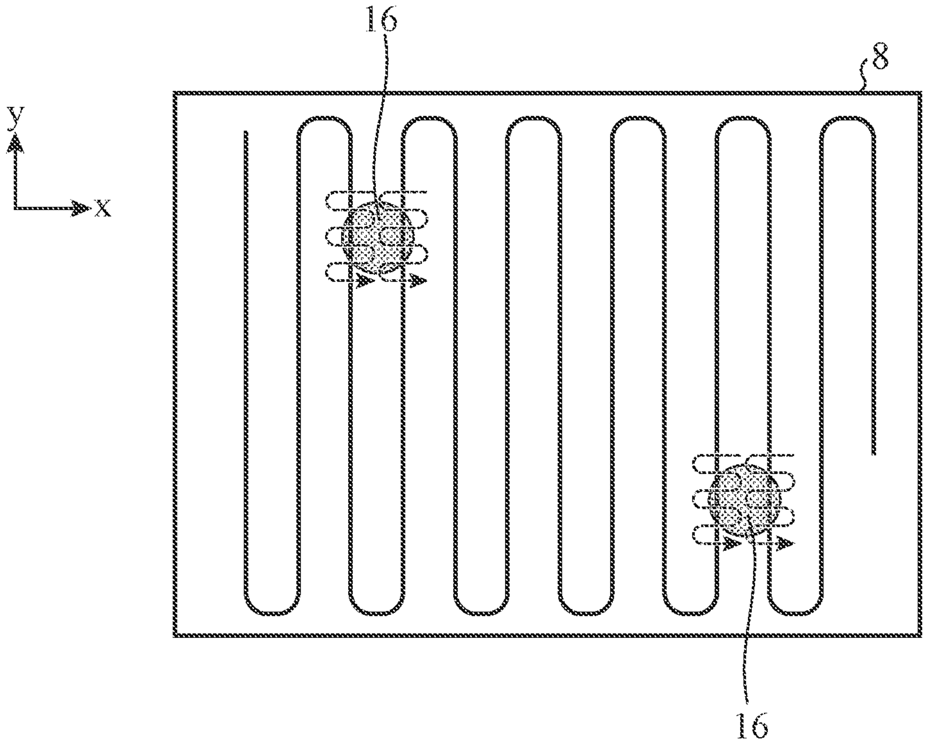
FIG. 13 is an explanatory diagram illustrating an example of a scanning trajectory of light.

FIG. 13 is an explanatory diagram illustrating an example of a scanning trajectory of light.

In the example of FIG. 13, the light source 1 or the light sources 1-1, 1-2, and 1-3 change the wavelength of the light output to the optical mode converter 5 or the like or the phase of the light output to the optical mode converter 5 or the like only when ranging is performed at two positions 16 on the face of the object 8 facing the optical scanning device 2. When ranging is performed at a position other than the two positions 16, the wavelength of light output from the light source 1 or the light sources 1-1, 1-2, and 1-3 to the optical mode converter 5 or the like is constant, and the phase of light output to the optical mode converter 5 or the like is constant.

In a case where the position 16 where the ranging needs to be performed in detail is only a part of the face of the object 8, the light source 1 or the like temporarily changes the wavelength or the like of the light output to the optical mode converter 5 or the like, thereby reducing unnecessary ranging and shortening the ranging time without deteriorating the ranging accuracy of the position 16.

It should be noted that the present disclosure can freely combine the embodiments, modify any component of each of the embodiments, or omit any component in each of the embodiments.

INDUSTRIAL APPLICABILITY

The present disclosure is suitable for an optical scanning device that radiates light into space and then reflects light reflected by an object.

The present disclosure is suitable for a ranging apparatus including the optical scanning device.

REFERENCE SIGNS LIST

1, 1-1, 1-2, and 1-3: Light source, 2: Optical scanning device, 3: Optical input port, 4, 4', 4-1, 4-2, and 4-3: Optical waveguide, **4*a*, 4*b*, and 4*c*: Branch destination, 5, 5', 5-1, 5-2, and 5-3: Optical mode converter, 5*a*: Waveguide connection port, 5*b*: Radiation face, 6: Mirror, 7: Actuator, 7*a*: First planar portion, 7*b*: Second planar portion, 7*c*: Third planar portion, 7*d*: First shaft, 7*e*: Second shaft, 8: Object, 9: Lens, 10: Optical receiver, 11: Distance calculation unit, 11*a*: Time measurement unit, 11*b*: Distance calculation Processing unit, 12: Control circuit, 13: Optical demultiplexer, 14: Optical circulator, 15: Optical output port, 16: Position, 21: Memory, 22**: Processor

What is claimed is:

1. An optical scanning device, comprising:

a light source capable of changing a wavelength or a phase of a light to be output;

an optical mode converter connected to an optical waveguide through which the light output from the light source transmits, and configured to radiate the light received through the optical waveguide;

a mirror arranged around the optical mode converter, and configured to reflect the light radiated from the optical mode converter and then reflected from an object, toward an optical receiver; and an actuator having a first planar portion, a second planar portion, and a third planar portion, wherein the second planar portion has a hole in which the first planar portion is disposed, and the third planar portion has a hole in which the second planar portion is disposed, wherein the third planar portion supports the second planar portion via a first shaft, and is connected to the second planar portion via the first shaft and rotatable about the first shaft, the second planar portion supports the first planar portion via a second shaft substantially perpendicular to the first shaft, and is connected to the first planar portion via the second shaft and rotatable about the second shaft, the first planar portion holds the optical mode converter and the mirror, the optical mode converter is configured to change a radiation direction of the light to be transmitted from the optical mode converter, in accordance with a change in wavelength of the light output from the light source or phase of the light output from the light source, and the actuator is configured to rotate the first planar portion about each of the first and second shafts.

2. The optical scanning device according to claim 1, wherein the radiation direction of the light from the optical mode converter is changed in an X-axis direction by rotation of the first planar portion to the second planar portion, and changed in a Y-axis direction by rotation of the second planar portion to the third planar portion, and the radiation direction of the light from the optical mode converter is changed by the optical mode converter in accordance with the change in wavelength of the light output from the light source or phase of the light output from the light source.

3. The optical scanning device according to claim 1, wherein as the optical mode converter, a plurality of optical mode converters is used, wherein the structure of the optical mode converters each is a boxlike structure that takes in the light propagated through the optical waveguide, each has a light radiation face provided with a grating coupler or an optical phase array, and are respectively arranged at positions different from each other, light radiation faces thereof being respectively arranged in directions different from each other.

4. The ranging apparatus according to claim 3, wherein as the optical mode converter, a plurality of optical mode converters is used, wherein the structure of the optical mode converters each is a boxlike structure that takes in the light propagated through the optical waveguide, each has a light radiation face provided with a grating coupler or an optical phase array, are respectively arranged at positions different from each other, light radiation faces thereof being respectively arranged in directions different from each other, as the optical receiver, a plurality of optical receivers is used, and the optical receivers are arranged at positions and configured to receive reflected lights that are lights radiated from the optical mode converters and then reflected by the object, respectively.

5. A ranging apparatus, comprising:

the optical scanning device according to claim 2;

an optical receiver to receive reflected light that is light radiated from the optical mode converter and then reflected by the object; and processing circuitry to measure a time from when light is radiated from the optical mode converter to when the reflected light is received by the optical receiver.

6. A ranging apparatus, comprising:

the optical scanning device according to claim 5;

an optical receiver to receive reflected light that is light radiated from the optical mode converter and then reflected by the object; and processing circuitry to measure a time from when light is radiated from the optical mode converter to when the reflected light is received by the optical receiver.

7. The ranging apparatus according to claim 6, wherein as the optical mode converter, a plurality of optical mode converters is used, wherein the structure of the optical mode converters each is a boxlike structure that takes in the light propagated through the optical waveguide, each has a light radiation face provided with a grating coupler or an optical phase array, are respectively arranged at positions different from each other, light radiation faces thereof being respectively arranged in directions different from each other, as the optical receiver, a plurality of optical receivers is used, and the optical receivers are arranged at positions and configured to receive reflected lights that are lights radiated from the optical mode converters and then reflected by the object, respectively.

8. The optical scanning device according to claim 1, wherein as the optical mode converter, a plurality of the optical mode converters is used, and lights having wavelengths different from each other or lights having phases different from each other are output from the light source to each of the optical mode converters.

9. A ranging apparatus, comprising:

the optical scanning device according to claim 8;

an optical receiver to receive reflected light that is light radiated from the optical mode converter and then reflected by the object, and processing circuitry to measure a time from when light is radiated from the optical mode converter to when the reflected light is received by the optical receiver.

10. The ranging apparatus according to claim 9, wherein as the optical mode converter, a plurality of optical mode converters is used, wherein the structure of the optical mode converters each is a boxlike structure that takes in the light propagated through the optical waveguide, each has a light radiation face provided with a grating coupler or an optical phase array, are respectively arranged at positions different from each other, light radiation faces thereof being respectively arranged in directions different from each other, as the optical receiver, a plurality of optical receivers is used, and the optical receivers are arranged at positions and configured to receive reflected lights that are lights radiated from the optical mode converters and then reflected by the object, respectively.

11. A ranging apparatus, comprising:

the optical scanning device according to claim 1;

an optical receiver to receive reflected light that is light radiated from the optical mode converter and then reflected by the object; and processing circuitry to measure a time from when light is radiated from the optical mode converter to when the reflected light is received by the optical receiver.

12. The ranging apparatus according to claim 11, wherein as the optical mode converter, a plurality of optical mode converters is used, wherein the structure of the optical mode converters each is a boxlike structure that takes in the light propagated through the optical waveguide, each has a light radiation face provided with a grating coupler or an optical phase array, are respectively arranged at positions different from each other, light radiation faces thereof being respectively arranged in directions different from each other, as the optical receiver, a plurality of optical receivers is used, and the optical receivers are arranged at positions and configured to receive reflected lights that are lights radiated from the optical mode converters and then reflected by the object, respectively.

* * * * *